United States Patent

[11] 3,556,193

| [72] | Inventor | Victor Duquesne |
| | | 42-44 Quellinstr, Antwerp, Belgium |
| [21] | Appl. No. | 699,847 |
| [22] | Filed | Jan. 23, 1968 |
| [45] | Patented | Jan. 19, 1971 |
| [32] | Priority | Feb. 3, 1967 |
| [33] | | Belgium |
| [31] | | No. 46489 |

[54] DEVICE FOR LOOSENING THE BEADS OF TIRES FROM A WHEEL RIM
7 Claims, 4 Drawing Figs.
[52] U.S. Cl. .................................................. 157/1.28
[51] Int. Cl. .................................................. B06c 25/06
[50] Field of Search ........................................ 157/1.17, 1.2, 1.26, 1.28

[56] References Cited
UNITED STATES PATENTS

| 2,753,924 | 7/1956 | Pearne | 157/1.28 |
| 2,795,268 | 6/1957 | Branick | 157/1.28 |
| 2,840,143 | 6/1958 | Skiles | 157/1.26 |

*Primary Examiner*—Granville Y. Custer, Jr.
*Attorney*—Linton & Linton

ABSTRACT: The present device is for separating the beads of a tire from a wheel rim and after one side of the rim is attached to a fixed jaw, a mobile jaw grips the opposite side of the rim whereby the rim is held between both jaws and pressure plates are brought to bear on both sides of the tire near the beads for pressing the tire beads from the rim.

INVENTOR.
VICTOR DUQUESNE,
BY
Linton & Linton
ATTORNEYS.

DEVICE FOR LOOSENING THE BEADS OF TIRES FROM A WHEEL RIM

When a tire must be removed from a wheel, it is necessary that the lever of a tire remover be driven between the rim and the respective beads of the tire.

This operation is sometimes quite difficult to carry out, due to the fact that tire beads show a tendency to adhere strongly to the rim. Moreover, there is always a risk of damaging the tire when driving the lever between the tire and rim.

In order to obviate these drawbacks, the method which has been followed until now consisted in laying the wheel on a horizontal table provided with a fixed jaw which holds the wheel while a pressure is supplied onto the opposite side of it by means of a pressure plate driven pneumatically or hydraulically. It is by the downward motion of this pressure plate that the bead of the tire, onto which the pressure acts, is loosened from the rim. The wheel is then turned upside-down on the table in order to undo the other tire bead from the rim, so that the tire is then altogether loose on the wheel and ready to be removed by the appropriate apparatus.

This procedure had however the disadvantage that the wheel must each time be turned around on the table, which takes a lot of time.

For doing away with this drawback, and in accordance with the main characteristic of the present invention, the device is moreover provided with a mobile jaw placed opposite the fixed jaw, whereby the wheel rim is clamped between both the aforesaid jaws. Facing the mobile pressure plate, there is a second mobile pressure plate, whereby both plates exert a pressure onto one flank of the tire to be removed. Means for enabling the mobile jaw to be moved toward the fixed jaw is also provided and between this mobile jaw and the pressure plate situated on the same side, there is a connecting element which moves simultaneously the aforesaid plate toward the wheel, means for bringing closer together the pressure plates when the rim is clamped between the jaws, in order to loosen the tire beads from the rim, and means for resetting both pressure plates as well as the mobile jaw into their initial position.

Here then, the wheel is solidly held and both beads of the tire can be loosened almost simultaneously from the rim without it being necessary to turn the wheel round for the purpose.

According to another important characteristic feature of the present invention, the jaws and pressure plates are situated side by side in a horizontal plane, approximately at the level of the centerline of a wheel which would be rolled on the floor between the aforesaid jaws and the pressure plates.

By means of this arrangement, it is thus possible to roll the wheel between the tools without having to lift it.

According to still another important characteristic feature of the present invention, the entire device is suspended in equilibrium between two spindles provided in the supports resting on the floor, whereby the whole can be rocked by means of a handle, according to the diameter of the wheel, until the jaws and the pressure plates have reached a convenient height with respect to the latter.

Hence, the device is suitable for wheels of various diameters. These characteristic features, as well as additional ones, will be still more clearly understood by reading the detailed description given hereafter of a possible form of embodiment of a device conforming to the present invention, which form of embodiment is however not exclusive. This description refers to the appended drawings of which:

The apparatus comprises two supports 1—2 of which each one is provided with a spindle 3 and 4 respectively.

Figure 2:
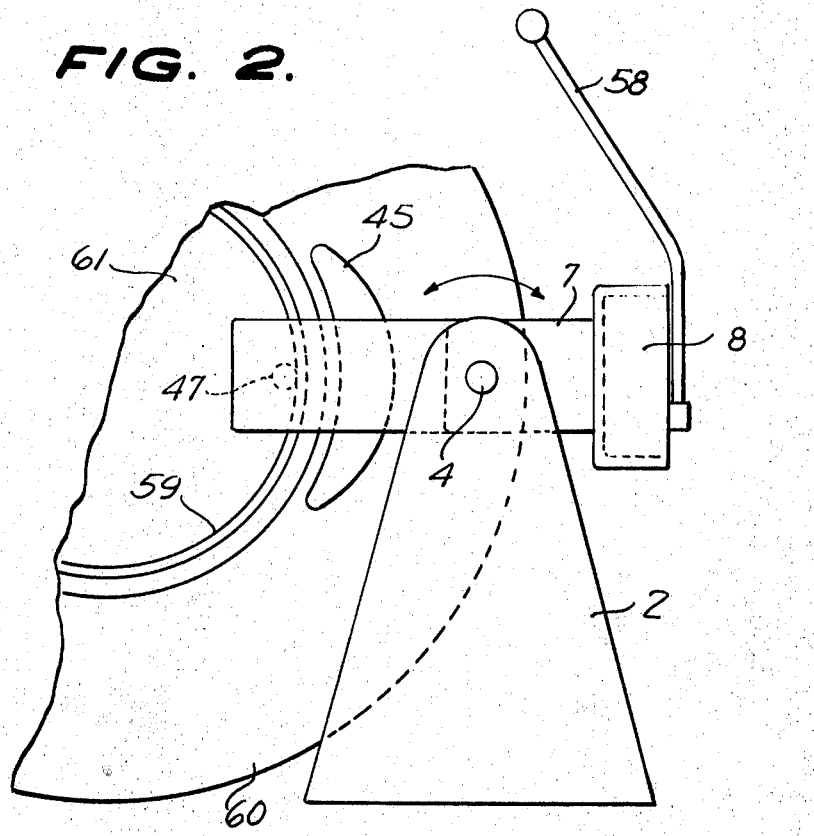
FIG. 2 is a side elevation taken in the direction of the arrow II of FIG. 1.
Figure 3:
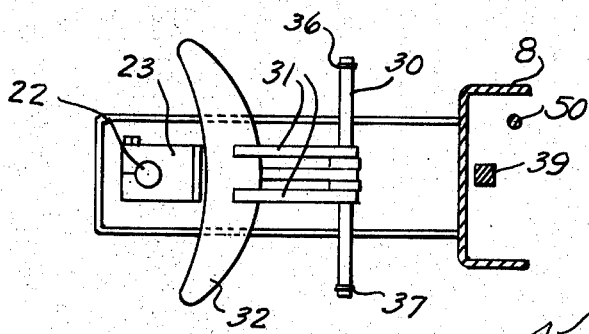
FIG. 3 is a cross section taken on the line 3–3 of FIG. 1.

A tipping frame 5 is suspended between the aforesaid spindles. This frame comprises two arms, 6 and 7 respectively, between which is fastened a U-beam 8. Three carrier arms 9, 10 and 11 respectively are mounted on this beam. Between the two carrier arms 9 and 10, two pneumatic cylinders 13 and 14 have been provided and are connected to a common tube 15. The latter is controlled by a three-way valve 16 solidly fastened in the U-beam and with which it is possible to connect the cylinders 13 and 14 through a tube 17 to a compressor (not shown), or through the outlet 18, to the open air. Cylinder 14 contains a piston 19 mounted on a piston rod 20 fitted with a shoulder 21 and which ends into a clamping rod 22. A mobile jaw 23 which can be exchanged, is fastened to this clamping rod 22 by means of a clamping collar and a bolt 24. The distance between the protruding part of the jaw and the clamping rod corresponds to the width of the wheel rim. A sleeve 25 is freely slideable on the clamping rod 22 bears against the shoulder 21 of the piston rod 20. This sleeve is integral with a bar 26 which, on the other hand, is connected to the piston rod 27 of piston 28, which latter moves in the cylinder 13. A rod 29, which on the one hand is fastened to the jaw 23 and on the other hand is freely slideable below the bar 26, holds the jaw 23 an equal distance from the clamping rod 22. A pivot 30 passes vertically right through the head of the piston rod 27. A double arm 31 is pivotally attached to pivot 30 and extends on a slant and in such way as to be able to tip, carrying a pressure plate 32 the outer edge of which is in the shape of an arc, of which the curvature corresponds to that of the edge of the tire bead. In the cylinder 13 is provided a second piston 33 integral with a piston rod 34 of which the free end also carries a pivot 35 which passes right through aforesaid rod 34. Joining both pivots 30 and 35, on either side of cylinder 13, two traction springs 36 and 37 respectively, have been provided, which draw together both pistons 28 and 33. By means of those two springs, the aforesaid pistons are more strongly urged together than is piston 19 to the bottom of cylinder 14, so that when air is admitted into the cylinders 13 and 14, it is piston 19 which will move first and carry with it piston 28 by means of the mechanism which has just been described. The piston rod 34 is connected by a bar 38 to one of the ends of a sliding rod 39 guided in supports 40 and 41 which are mounted in the beam 8. The other end of aforesaid sliding rod carries an arm 42 provided with a pivot 43 about which an arm 44 can rock; this arm is slanting and carries a pressure plate of the same shape as the pressure plate 32. Both pressure plates 32 and 45 are mounted so as to face each other. There is also provided an additional traction spring 46 between the U-beam and the sliding rod 39, so that at the moment when air enters cylinder 13, piston 28 moves before piston 33. This is of prime importance, as will be readily understood by the description which is given hereafter of how the device operates. The carrier arm 11 is provided with a fixed clamping rod 47 about which is fastened by means of a bolt 49 a sliding jaw 48 which can be exchanged. The shape of this jaw is the same as that of jaw 23 and the distance between the edge of the jaw and the clamping rod corresponds to the width of the edge of a wheel rim. The valve 16 is controlled by a rod 50 which is guided in supports 40 and 41. A pressure spring 51 is mounted between a collar 52 on the rod 50 and an eyelet 53 integral with the beam 8. This spring tends to prevent one of the ends of the rod 50 from pressing against the rod 54 of valve 16, which rod determines the position of said valve. The spring 51 also urges the other end of rod 50 against a lever 55, mounted on an axle 56 which can rotate in a bearing 57, fastened in the beam 8. This axle is controlled by a handle 58 which is fastened to it and which, when it is moved in a direction at right angles to that which causes the axle 56 to rotate, tips the frame around the pivots 3 and 4, which as shown by the arrows in FIG. 2 which will be mentioned in fuller detail during the following description of how the device operates. It should be noted that the entire device is suspended in such way between the pivots 3 and 4 that it is in perfect balance.

Figure 1:
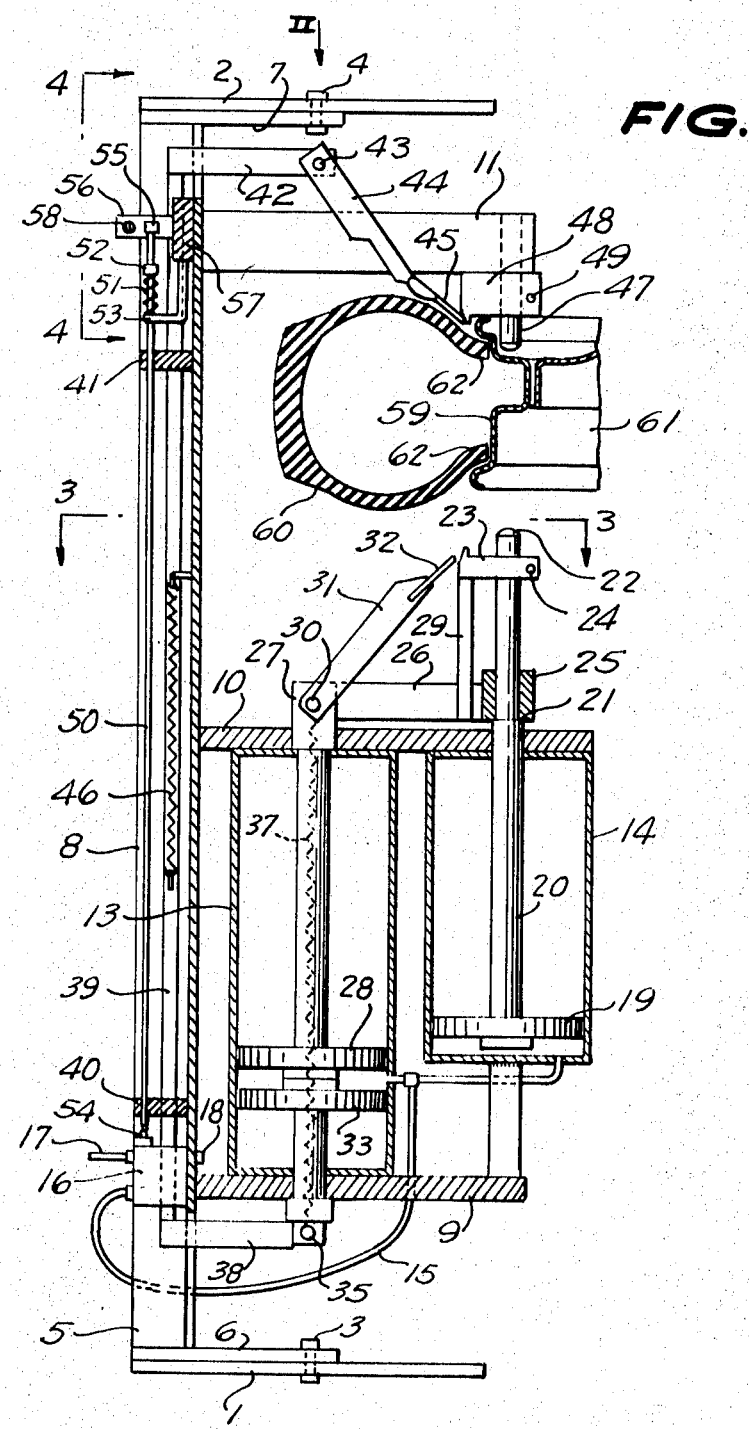
FIG. 1 is a plan view in partial sections of the device conforming to the present invention.
Figure 4:
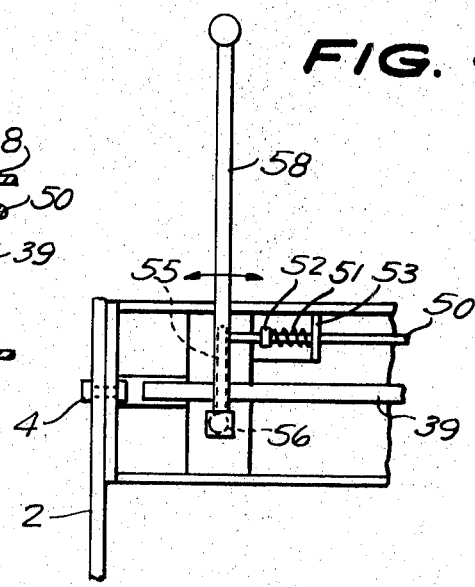
FIG. 4 is a rear view of the part represented in FIG. 1 by the straight line 4–4.

When it is required to loosen a tire 60 from a wheel rim 59, the wheel 61 is rolled in a vertical position on the ground until it is between the pressure plates 32 and 45 and, according to the diameter of the wheel, the frame 5 is rotated about the pivots 3 and 4 by means of the handle 58 (FIG. 2), until the rim 59 of the wheel is received between the clamping rod 47 and the jaw 48, after which the wheel is slightly slid to one side until the edge of the rim is between the aforesaid rod 47 and the jaw 48 (FIG. 1). The handle 58 is then pivoted laterally about the axle 56 as shown by the arrows in FIG. 4, so that the lever 55 which is mounted thereon exerts a pressure on the rod 50. As a consequence thereof, said rod moves lengthwise in such way that its end exerts a pressure on the rod 54 of the pneumatic valve 16 which, in this position, lets air into the cylinders 13 and 14. Due to springs 37 and 46, the air which enters will first displace piston 19 in cylinder 14.

It follows therefrom that the clamping rod 22, which is part of piston rod 20, as well as the jaw 23 which is fastened to it, will move toward the wheel until the wheel is firmly held on both sides between the clamping rods 22 and 47 and the jaws 23 and 48. During its motion, the piston rod 20 has carried along by means of its shoulder 21, the sleeve 25 so that the bar 26 which is fastened to it has simultaneously displaced the piston rod 27 and the pressure plate 32 and that the latter has been brought right up against the tire 60 when the clamping rod 22 moves toward the wheel, the shoulder 21 moves the sleeve 25 carrying bar 26, pivot 30, double arm 31, and pressure plate 32 in the same direction. When the wheel is gripped between the jaws 23 and 48, piston 19 is blocked, so that the air pressure in cylinder 13 increases. This makes the piston 28 move in cylinder 13, whence the piston rod 27 brings the pressure plate 32 closer to the tire, whereas the sleeve 25 slides onto the rod 22 which latter is now stationary. Due to the fact that, between the beam 8 and the rod 39, an additional spring 46 is mounted, the piston 33 will only move after piston 28. This being so, the pressure plate 45 will never be displaced in the direction of tire bars 60 by means of piston 33, rod 39 and and the connecting bars 38 and 42, before the pressure plate 32 begins to exert such a pressure onto the tire that the wheel might come loose between the clamping rod 47 and the jaw 48. When the pressure plates 32 and 45 are touching the flanks of tire 60, the arms 31 and 44 to which these plates are fastened will begin to rotate about their respective axes 30 and 43, thus driving the extremities of said pressure plates between the beads 62 of tire 60 and the wheel rim 59. When these pressure plates come closer together, they will simultaneously release both tire beads from the rim. When handle 58 is put back into its initial position, spring 51 will move apart rod 50 from rod 54 of valve 16, so that the latter moves back into its initial position, i.e., cylinders 13 and 14 are once more open to the atmosphere through the exhaust 18. Springs 36 and 37 pull once more pistons 28 and 33 together while sleeve 25 brings back, by means of the bar 26 and the shoulder 21, piston 19 to its initial position. This motion expels air from the cylinders 13 and 14 so that the device returns to its position of rest. Wheel 61 is en disengaged from its position between the stationary claw 48 and the clamping rod 47, and the wheel is removed from the device by rolling it on the floor.

It is evident that some of the elements described above may be replaced by other parts which fulfill the same function, that the relative position of the elements may also be varied and that, if need be, the device may be completed by subsidiary elements.

I claim:

1. Device for loosening the tire beads from a wheel rim, comprising a fixed jaw capable of holding one side of the rim, a mobile pressure plate adjacent said fixed jaw and capable of exerting a pressure on the part of the tire bead adjacent to said fixed plate, means for moving said pressure plate toward the tire, a mobile jaw facing said fixed jaw, whereby the rim can be gripped between said jaws, a second mobile pressure plate facing said first pressure plate and capable of exerting a pressure on the part of the bead adjacent to the edge of said mobile jaw; means for moving said mobile jaw toward said fixed jaw, means slideably connecting said mobile jaw and said second pressure plate for moving said second pressure plate towards the wheel with said mobile jaw, means for further moving said second plate relative to said first pressure plate when the rim is clamped between the jaws in order to loosen the tire beads from the rim, and means to return both said pressure plates and the mobile jaw to their initial position.

2. Device as defined in claim 1, including a pair of supports, a pair of pivots on said supports pivotally supporting the previously described elements whereby the device can be pivoted to position said jaws and said pressure plates of an operative height with respect to the wheel.

3. Device as defined in claim 1, including a pneumatic cylinder, a piston slideably positioned in said cylinder, a rod on said piston fastened to said mobile jaw whereby the rim can be clamped between said piston rod and said jaws, a pair of pistons, a second cylinder having said pair of pistons slideably positioned therein for operating in opposite directions, a piston rod on each of said pair of pistons, an arm carried on one of said second piston rods, one of said pressure plates fixed on said arm, a second arm carrying a second of said pressure plates and a system of rods operatively connecting said second arm to the other of said second piston rods.

4. Device as defined in claim 3, in which a bar is connected to an end of the piston rod acting directly on said arm carrying said pressure plate, a sleeve sliding on the piston rod carrying the mobile jaw bearing against a shoulder provided on said piston rod, which shoulder only can move said sleeve and thus said pressure plate in the direction of the wheel and said bar is attached to said sleeve.

5. Device as defined in claim 3, in which the arms of said pressure plates are pivotally fastened to said bars.

6. Device as defined in claim 3, in which at least one traction spring is provided urging both said pistons in said second cylinder together, a second traction spring provided between the frame of the device and said system of rods controlling said second pressure plate whereby said piston which controls said system of rods is subjected to an additional resilient pressure.

7. Device as defined in claim 3, including a pair of supports, pivots on said supports supporting the aforementioned elements whereby the device can be tipped, a handle for tipping said elements and fixed on an axis, a rod, a spring tending to bring said rod to bear against said handle, a valve for controlling said cylinders and an end of said rod being positioned for operating said valve.